United States Patent [19]
Yamada et al.

[11] Patent Number: 5,461,209
[45] Date of Patent: Oct. 24, 1995

[54] STUD BOLT

[75] Inventors: Mitsuyasu Yamada, Aichi; Yuji Kojyo, Kanagawa; Masaharu Imahara, Tochigi; Hiroshi Endo; Yasuko Natsume, both of Aichi; Hiromi Ogawa, Saitama; Yoshiteru Kondo, Aichi; Hideharu Nakagami, Aichi; Hitoshi Kawaguchi, Aichi, all of Japan

[73] Assignee: Emhart Inc., Newark, Del.

[21] Appl. No.: 187,940

[22] Filed: Jan. 27, 1994

[30] Foreign Application Priority Data

Jan. 27, 1993 [JP] Japan ................................ 5-001813 U

[51] Int. Cl.⁶ .................................................. B23K 9/20
[52] U.S. Cl. ........................ 219/99; 219/98; 411/171
[58] Field of Search .................... 219/98, 99; 411/171, 411/423

[56] References Cited

U.S. PATENT DOCUMENTS

| | | | |
|---|---|---|---|
| 1,872,166 | 8/1932 | Muhlig | 411/423 |
| 3,182,172 | 5/1965 | Dash | 219/98 |
| 3,352,996 | 11/1967 | Neumeier | 219/98 |
| 3,694,611 | 9/1972 | Ettinger | 219/98 |
| 3,918,345 | 11/1975 | Phipard, Jr. | 411/423 |
| 5,190,424 | 3/1993 | Kazino et al. | 411/171 |

FOREIGN PATENT DOCUMENTS 2227384  2/1973  Germany ............................ 219/98

*Primary Examiner*—Clifford C. Shaw
*Attorney, Agent, or Firm*—E. D. Murphy

[57] ABSTRACT

A stud which is automatically fed so as to welded stably and properly, has a large electric contact surface with the collet, facilitates clip attachment, and maintains the engagement firmly after the attachment of the clip. A stud 1 extends upwardly into a rod-like form which is threaded on its periphery, and includes a welding tip at the lower end thereof for welding to a base member such as a panel so as to be used in mounting a member to be attached on the base member. The stud 1 is formed to be short in overall length and its welding tip is formed as a flange 4 whose diameter is larger than that of the rod-like body. A crest 6 of the screw 3 is formed flat. An upper flank angle 8 of the screw is formed large while a lower flank angle 10 of it is formed small. An edge 12 of an upper end 11 of the stud is chamfered.

6 Claims, 1 Drawing Sheet

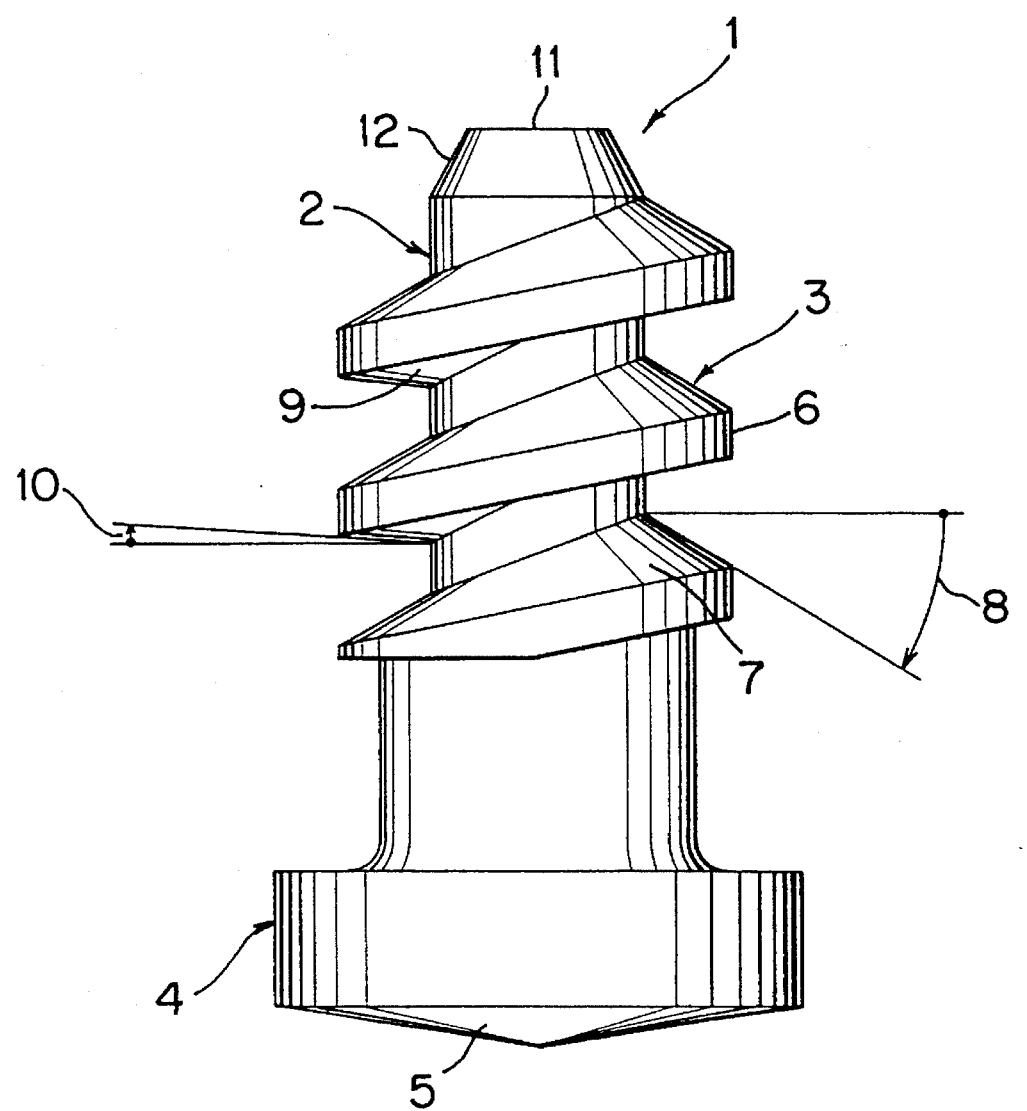

STUD BOLT

DESCRIPTION OF INVENTION

1. Field of Invention

The present invention relates to a stud bolt extending upwardly in a rod-like form, threaded downwardly from the upper end on the periphery, and formed with a welding tip at the lower end to be welded to a base member such as an automotive body panel, for use in mounting a member to be attached on the base member.

BACKGROUND

There is a well-known stud bolt extending upwardly in a rod-like form, being threaded downwardly from the upper end to be welded to a base member such as a panel, for use in mounting a member to be attached on the base member. This stud bolt is frequently used to mount a decorative member or the like on, for example, a vehicle body since the decorative member can be attached to a clip, which is then mounted on a stud member attached to a base. The clip is mounted by forcing it over the stud and removed by rotation.

Automatic stud welding is a generally used method to weld a stud bolt to a vehicle body and in that work, studs have to be fed automatically one by one, with the welding end leading, to a welding gun. It sometimes occurs that the studs are not kept in their proper orientation in feeding which causes the gun to jam. Since the periphery of the stud is threaded, only a small electric contact surface exists between the collet and the stud. This limited contact area may not be sufficient for the high welding currents used, and also tends to produce electrolytic corrosion.

OBJECTS AND ADVANTAGES OF THIS INVENTION

Accordingly, the present invention aims to provide a stud bolt which is automatically fed so as to be welded stably and properly, has a large electric contact surface with the collet, facilitates clip attachment and maintains firm engagement after the attachment.

In order to achieve the above-described object, there is provided a stud bolt extending upwardly into a rod-like form, being threaded downwardly from the upper end on the periphery, and being formed with a welding tip at the lower end to be welded to a base member such as a panel, for use in mounting a member to be attached on the base member; characterized in that the stud bolt is formed short in overall height and the welding tip is formed as a flange which is larger in diameter than the rod-like body, the screw thread being formed with a flat crest, a large upper flank angle and a small lower flank angle, the edge of the upper end of the stud being chamfered.

The stud formed in a bolt-like configuration as stated above can be fed automatically so as to be welded stably and properly; has a large electric contact surface between it and the collet; facilitates clip attachment; and maintains the engagement firmly after the attachment of the clip.

BRIEF DESCRIPTION OF ACCOMPANYING DRAWINGS

FIG. 1 is a front view of a stud bolt according to the present invention.

DESCRIPTION OF A PREFERRED EMBODIMENT

The present invention is described further by way of an embodiment, referring to an accompanying drawing. In FIG. 1, a stud bolt 1 according to the present invention has a body 2 extending upward into a rod-like form, and a threaded portion or screw 3 is formed from the upper end downwardly on the periphery. At the lower end of the stud 1, a flange 4 whose diameter is larger than that of the rod-like body 2 is formed as a welding tip. As the bottom surface of the flange 4 is welded to a base member, an end 5 is tapered toward the center to facilitate its attachment to the base member. The stud bolt 1 of the present invention is formed shorter in overall length compared to conventional ones. To prevent tumbling in the feed channel, the flange must be kept relatively small. For instance, conventional studs are 13 mm high but the height of the stud bolt 1 of the present invention is reduced by about a half to as short as 6.5 mm. In this case, in order to give it a suitable configuration, the screw 3 is formed with an outer diameter of 3 mm while the flange diameter is 4 mm and the flange thickness is 1 mm. These proportions produce a bolt-like configuration which enables the stud to be maintained in proper orientation when fed by automatic machinery.

A crest 6 of the threaded portion 3 is formed flat so that its electrical contact surface to the collet of a welding gun can be much larger than usual. Also owing to this flat surface, the collet is capable of holding the stud bolt stably. While a flank angle 8 of an upper flank 7 of the thread 3 is formed large, a flank angle 10 of a lower flank 9 is formed small. For example, the screw is formed to be 0.5 mm in the pitch of threads, 0.4 mm in the height of the crest 6, 0.5 mm in the length (height) between adjoining crests, 0.3 mm in the height of the upper flank 7 and almost zero in the height of the lower flank 9. The threaded portion 3 formed as above facilitates easier clip attachment. At the same time, it provides a high engagement force after the attachment. This difference between low attachment force and high pull-off force is highly desirable and results from the difference between the flank angle of the thread. The edge 12 of the upper end 11 of the stud is preferably chamfered for higher ease of clip attachment.

We claim:

1. A component-mounting stud adapted to be fed to a collet of a welding machine and welded perpendicularly to a surface in an automobile comprising a rod-like body adapted to extend outwardly from said surface and to receive components to be mounted thereon;

a weldable flange at one end of said body adapted to be welded to said surface by application of a welding current through said collet, said stud and said surface;

a helical thread formed on the periphery of said body, said thread comprising upper and lower helical surfaces and a flat crest therebetween, said crest being adapted to be engaged by a collet for presentation to a surface and for conduction of welding current;

the area of engagement between the collet and said flat crest being sufficient to prevent movement of said stud during welding thereof and to provide a low current density between the collet and said stud so as to reduce electrolytic corrosion in said engagement area.

2. A component-mounting stud as claimed in claim 1 wherein said upper helical surface slopes downwardly toward said flange at a first selected flank angle and said lower helical surface slopes upwardly away from said flange at a second selected flank angle, said first angle being larger than said second angle so that a smaller force is required to push a component onto said stud than to pull the component off of said stud.

3. In the method of welding a threaded T-shaped stud for receiving a fastening element to an automobile body panel which includes the steps of providing a welding machine including a collet, said collet being adapted to hold the stem of said stud during presentation of the head of said stud to said body panel and to conduct a welding current to said stud to weld said stud to said panel, said collet having a plurality of jaws with internal gripping surfaces arranged around an axis, the improvement comprising providing a flat-crested thread on the stem of said T-shaped stud to provide a large area of contact with said gripping surfaces; and using said contact area to maintain said stud in alignment with said axis of said collet jaws and to minimize the welding current density between said collet and said stud.

4. A method as claimed in claim 3 and further comprising the steps of providing a large flank angle on the upper surface of said thread and a small flank angle on the lower surface of said thread so that the push-on force required to attach said fastening element is lower than the force required to pull off said fastening element.

5. A stud bolt for use in mounting a component to be attached on a base member, said bolt comprising a rod-like body, said body being threaded on its periphery; and a welding tip at one end, said tip being adapted to be welded to the base member;

said thread comprising a flat crest, a large upper flank angle and a small lower flank angle, the edge of the upper end of said body being chamfered.

6. A stud bolt as claimed in claim 5 wherein the diameter of said welding tip is not more than 50% larger than the outer diameter of said body.

* * * * *